Nov. 17, 1931.  A. B. DE GIORGI  1,832,189
LINESWITCH DRIVING ARRANGEMENT FOR MOTOR AND HAND OPERATION
Filed July 29, 1929
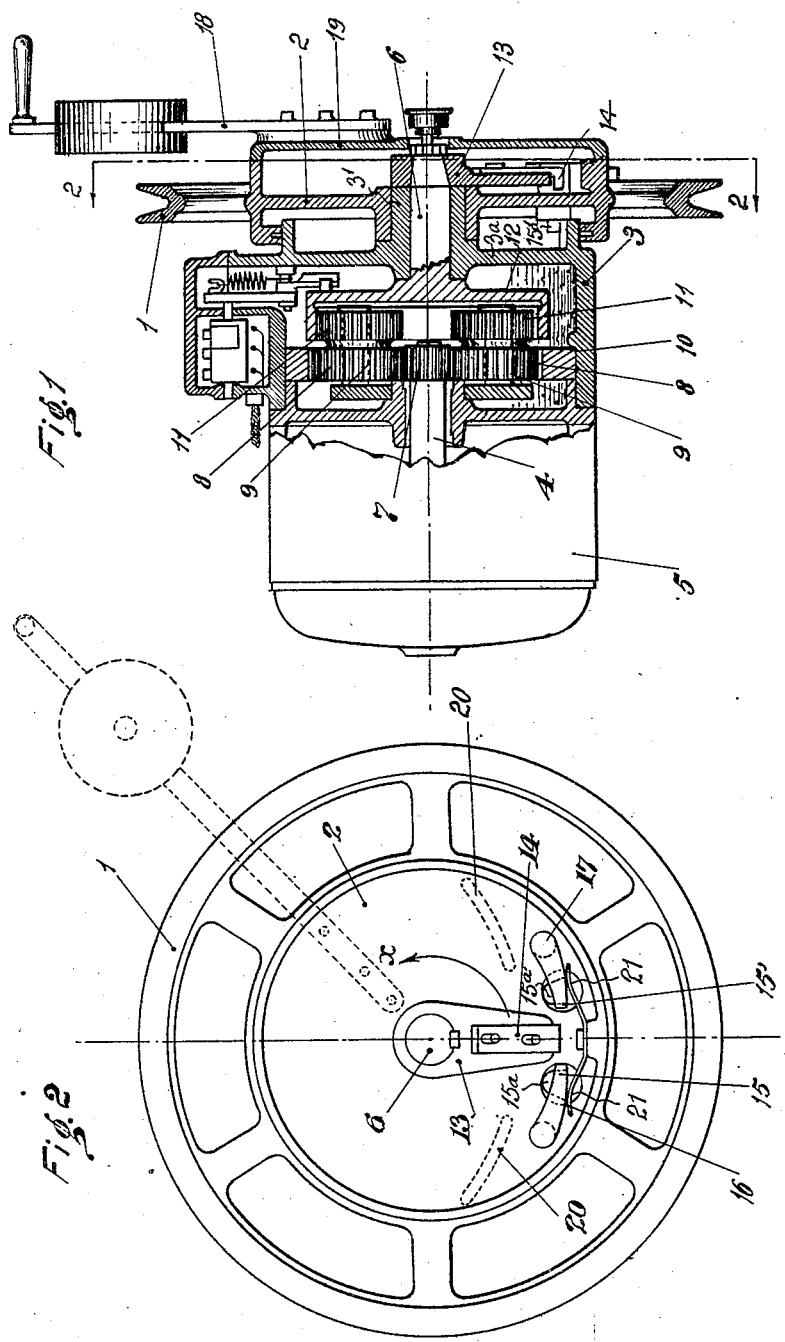
A. Bagnagatti De Giorgi
INVENTOR
By: Marks & Clerk
Attys.

Patented Nov. 17, 1931

1,832,189

UNITED STATES PATENT OFFICE

ACHILLE BAGNAGATTI DE GIORGI, OF MILAN, ITALY

LINESWITCH DRIVING ARRANGEMENT FOR MOTOR AND HAND OPERATION

Application filed July 29, 1929, Serial No. 382,007, and in Italy February 4, 1929.

The present invention relates to lineswitch driving arrangement for motor and hand operation.

As compared with the arrangements heretofore known, the arrangement according to the present invention exhibits the advantage that it does away with the complicated devices for going over from hand to motor operation. Besides it dispenses with the mechanical or electromagnetic brakes, owing to the provision of a special planetary transmission gear which allows of a high reduction in the number of revolutions from the motor to the switch drive proper and to automatically recuperate the inertia energy of the revolving parts.

The invention essentially distinguishes itself by the fact that the driving pulley is entrained into rotation by a radial arm of the main driving shaft, this arm coming into engagement with pawls secured to the pulley body, and the main driving shaft being actuated by the shaft of an electric motor through satellite pinions and toothed rims.

The body of the driving pulley is invariably connected to a hand operating crank; when this crank is actuated, the pulley revolves and its pawls are brought out of engagement with the above named arm by means of cams against the action of a return spring.

The accompanying drawings illustrate, by way of example only, one form of the invention.

Fig. 1 shows the arrangement in longitudinal projection;

Fig. 2 shows the arrangement in cross projection along the line 2—2 in Fig. 1.

The driving pulley 1 has a body 2 resting on the casing 3, in which the planetary gear is lodged for transmission of the movement from the shaft 4 of the motor 5 to the main driving shaft 6.

As may be seen from the drawings, the motor shaft 4 carries a pinion 7 meshing with the satellite pinions 8, which are fixed on spindles 9 and mesh with a toothed rim 10. On the spindles 9 the pinions 11 are also keyed, which engage the toothed rim 12 invariably connected to the main driving shaft 6. The revolving movement of the shaft 4 is therefore transmitted to the main driving shaft 6 with a very high reduction in the number of revolutions, as required for operating the switch.

The shaft 6 rotated by the speed reducing gear carries an arm 13 provided with a catch 14 movable freely in axially direction and during rotation is adapted to engage either one of the pawls 15 and 15', said pawls being pivotally secured to the disk 2 and consequently rotated therewith, or these pawls are rotated by a spring 16. In this manner the shaft 6 and disk 2 are connected with each other during rotation.

In order to obtain the automatic stopping of the disk 2 during rotation of the shaft 6, cams 20 are provided which serve to disengage the pawls 15 or 15' from the catch 14. These cams are fixed upon the stationary wall 3ª of the body 3 and act upon extensions 15ª and 15ª' carried by said pawls. More precisely, when at the end of a revolution of the disk 2, the pawl 15 lies opposite a cam 20 which acts upon the extension 15ª and overcomes the action of the spring 16 of the active cam, thus moving the pawl so that the end thereof disengages the catch 14. Accordingly, the arm 13 which is fixed upon the shaft 6 continues to rotate, while the disk 2 is brought to a standstill. Since the body 2 is rotatable on a sleeve 3', said body can be operated by hand when desired, through the medium of the hand lever 18. In order that the pulley may be operated independently of the motor, the hand lever may form a permanent part of the body 2 to rotate therewith, or it may be detachably connected for motor operation alone.

The whole arrangement can be advantageously carried out as a compact construction and be enclosed in a casing which at the same time serves as a receptacle for the lubricant and as a protection against weather influences, so that the apparatus can be installed in the open without prejudice.

Further the compact construction reduces the occupied space to a minimum.

Of course the execution details may be varied in practice within the spirit and scope of the invention.

What I claim and desire to secure by United States Letters Patent is:

1. A device of the class described comprising an electrical motor, planetary transmission gearing driven by the shaft thereof, a main drive shaft driven by the gearing, a pulley rotated by the gearing, movable projections carried by the pulley, a radially disposed arm carried by the main drive shaft adapted to engage one of said projections to impart rotary movement to the pulley.

2. An arrangement according to claim 1 characterized by the fact that the main driving shaft is fixedly connected to a radial arm provided with an axially adjustable extension adapted to come into engagement with the movable projections secured to the pulley, conjugated cams on said casing consisting in spring loaded pawls which are brought out of engagement with the radial arm by means of said cams, the pulley having connected therewith a crank for hand operation.

3. An arrangement according the claim 1 and characterized by the fact that the planetary transmission gearing comprises a pinion fixed on the motor shaft, satellite pinions meshing therewith, a circumscribing toothed rim fixed to said casing, also meshing with said satellite pinions, each satellite pinion having fixed on its hub another pinion, a circumscribing toothed rim meshing with the last named pinions and fixedly connected to the main driving shaft of the pulley.

ACHILLE BAGNAGATTI DE GIORGI.